United States Patent
Koehler et al.

(10) Patent No.: US 6,650,660 B1
(45) Date of Patent: Nov. 18, 2003

(54) APPARATUS AND METHOD FOR SYNCHRONIZATION OF MULTIPLE DATA PATHS AND RECOVERY FROM LOST SYNCHRONIZATION

(75) Inventors: Jeffrey A. Koehler, Westborough, MA (US); Eric J. Spada, Lexington, MA (US); Eric J. Pelletier, Lexington, MA (US)

(73) Assignee: Pluris, Inc., Cupertino, CA (US)

( * ) Notice: Subject to any disclaimer, the term of this patent is extended or adjusted under 35 U.S.C. 154(b) by 0 days.

(21) Appl. No.: 09/361,467

(22) Filed: Jul. 27, 1999

(51) Int. Cl.[7] .................................................. H04J 3/12
(52) U.S. Cl. ...................... 370/503; 370/474; 370/510; 370/514; 375/354
(58) Field of Search .......................... 370/474, 477, 370/503, 508, 509, 510, 511, 512, 513, 514, 476; 375/354, 355, 368

(56) References Cited

U.S. PATENT DOCUMENTS

| | | | |
|---|---|---|---|
| 5,440,550 A | 8/1995 | Follett | ........................... 370/60 |
| 6,002,455 A | * 12/1999 | Enomoto et al. | ......... 348/845.2 |
| 6,252,634 B1 | * 6/2001 | Yuen et al. | .................. 348/731 |

FOREIGN PATENT DOCUMENTS

EP 0 531 599 A1 3/1993 ........... H04L/12/56

OTHER PUBLICATIONS

Merayo, et al. "Technology for ATM Multigigabit/s Switches," 1994 IEEE pp 117–122.
Plaza, et al. "2.5 Gbit/s ATM Switch Chip Set," 1995 IEEE pp 173–176.
Ippoliti, et al. "Parallel Media Access Controller for Packet Communications at Gb/s Rates," 1990 IEEE pp 323.7.1–323.7.6.

* cited by examiner

*Primary Examiner*—Dang Ton
*Assistant Examiner*—Shick Hom
(74) *Attorney, Agent, or Firm*—Donald R. Boys; Central Coast Patent Agency, Inc.

(57) ABSTRACT

A system and method for transferring data from a source to a destination are described. Data packets are split into multiple data packet portions and are transferred in parallel over parallel data streams or pipes to grouping circuitry where they are recombined into full data packets. Each packet portion is assigned a synchronization code and a pipe state machine state. The grouping circuitry reads individual packet portions from the parallel streams and analyzes the synchronization codes and the state machine states to determine if the individual packet portions were generated from the same packet. If so, they are recombined into a full packet and are forwarded to the destination. If not, an error is detected. The grouping circuitry automatically realigns the data streams to recover synchronization without the need for any feedback to the individual streams to correct the error.

30 Claims, 13 Drawing Sheets

Pipe Sync State Machine

| 20H | 21H | 22H | 23H | 24H | 25H | 26H | 27H | 28H | 29H | 30H | 31H |
|---|---|---|---|---|---|---|---|---|---|---|---|
| -- | Idle | Idle | Idle | + | Idle | Idle | Idle | -- | Idle | Idle | Idle |
| 0 | 1 | 2 | 3 | 0 | 1 | 2 | 3 | 0 | 1 | 2 | 3 |
| ^DATA_OK_N | | | | ^DATA_OK_P | | | | ^DATA_OK_N | | | |

| 20L | 21L | 22L | 23L | 24L | 25L | 26L | 27L | 28L | 29L | 30L | 31L |
|---|---|---|---|---|---|---|---|---|---|---|---|
| -- | Idle | Idle | Idle | + | Idle | Idle | Idle | -- | Idle | Idle | Idle |
| 0 | 1 | 2 | 3 | 0 | 1 | 2 | 3 | 0 | 1 | 2 | 3 |
| ^DATA_OK_N | | | | ^DATA_OK_P | | | | ^DATA_OK_N | | | |
| 0 | 1 | 2 | 3 | 0 | 1 | 2 | 3 | -- | 1 | 2 | 3 |
| 20H | 21H | 22H | 23H | 24H | 25H | 26H | 27H | 28H | 29H | 30H | 31H |
| 20L | 21L | 22L | 23L | 24L | 25L | 26L | 27L | 28L | 29L | 30L | 31L |
| 0 | | | | 0 | | | | | | | |

Cont. from Fig. 6A

| 20H | 21H | 22H | 23H | 24H | 25H | 26H | 27H | 28H | 29H | 30H | 31H |
|---|---|---|---|---|---|---|---|---|---|---|---|
| -- | Idle | Idle | Idle | + | Idle | Idle | Idle | -- | Idle | Idle | Idle |
| 0 | 1 | 2 | 3 | 0 | 1 | 2 | 3 | 0 | 1 | 2 | 3 |
| ^DATA_OK_N | | | | ^DATA_OK_P | | | | ^DATA_OK_N | | | |
| 20L | 21L | 22L | 23L | 24L | 25L | 26L | 27L | 28L | 29L | 30L | 31L |
| -- | Idle | Idle | Idle | + | Idle | Idle | Idle | -- | Idle | Idle | Idle |
| 0 | 1 | 2 | 3 | 0 | 1 | 2 | 3 | 0 | 1 | 2 | 3 |
| ^DATA_OK_N | | | | ^DATA_OK_P | | | | ^DATA_OK_N | | | |
| 0 | 1 | 2 | 3 | 0 | 1 | 2 | 3 | 0 | 1 | 2 | 3 |
| 20H | 21H | 22H | 23H | 24H | 25H | 26H | 27H | 28H | 29H | 30H | 31H |
| 20L | 21L | 22L | 23L | 24L | 25L | 26L | 27L | 28L | 29L | 30L | 31L |
| 0 | 1 | 2 | 3 | 0 | 1 | 2 | 3 | 0 | 1 | 2 | 3 |

Cont. from Fig. 6B

*Fig. 6B Continued*

| 20H | 21H | 22H | 23H | 24H | 25H | 26H | 27H | 28H | 29H | 30H | 31H |
|---|---|---|---|---|---|---|---|---|---|---|---|
| -- | Idle | Idle | Idle | + | Idle | Idle | Idle | -- | Idle | Idle | Idle |
| | | | | ^Sync Recovered | | | | | | | |
| 3 | 3 | 3 | 3 | | 0 | 1 | 2 | 3 | 0 | 1 | 2 | 3 |
| 0 | 1 | 2 | 3 | | ^Data_OK_P | | | | ^Data_OK_N | | | |
| ^SYNC_WT_P2 | | | | | | | | | | | |
| 20L | 21L | 22L | 23L | 24L | 25L | 26L | 27L | 28L | 29L | 30L | 31L |
| -- | Idle | Idle | Idle | + | Idle | Idle | Idle | -- | Idle | Idle | Idle |
| 0 | 1 | 2 | 3 | 0 | 1 | 2 | 3 | 0 | 1 | 2 | 3 |
| ^DATA_OK_N | | | | ^DATA_OK_P | | | | ^DATA_OK_N | | | |
| Skip | Skip | Skip | Skip | 24H | 25H | 26H | 27H | 28H | 29H | 30H | 31H |
| 20L | 21L | 22L | 23L | 24L | 25L | 26L | 27L | 28L | 29L | 30L | 31L |
| Disc | Disc | Disc | Disc | ^Grouper has seen one complete correct sequence, lets data pass. | | | | | | | |
| | | | | <--extent of "missing" data, not passed on | | | | | | | |

Cont. from Fig. 6C

*Fig. 6C Continued*

| 20H | 21H | 22H | 23H | 24H | 25H | 26H | 27H | 28H | 29H | 30H | 31H | 32H | 33H | 34H | 35H |
| -- | Idle | Idle | Idle | + | Idle | Idle | - | Idle | Idle | + | Idle | Idle |
| ^Sync recovered 0 1 2 3 ^DATA_OK_N | 0 1 2 3 ^DATA_OK_P | 0 1 2 3 ^DATA_OK_N | 0 1 2 3 ^DATA_OK_P |
| 20L | 21L | 22L | 23L | 24L | 25L | 26L | 27L | 28L | 29L | 30L | 31L | 32L | 33L | 34L | 35L |
| -- | Idle | Idle | + | Idle | Idle | - | Idle | Idle | + | Idle | Idle |
| 0 1 2 3 ^DATA_OK_N | 0 1 2 3 ^DATA_OK_P | 0 1 2 3 ^DATA_OK_N | 0 1 2 3 ^DATA_OK_P |
| 20H | 21H | 22H | 23H | 24H | 25H | 26H | 27H | 28H | 29H | 30H | 31H | 32H | 33H | 34H | 35H |
| 20L | 21L | 22L | 23L | 24L | 25L | 26L | 27L | 28L | 29L | 30L | 31L | 32L | 33L | 34L | 35L |

^Remaining data is now correct
<-- extent of "missing" data, not passed on

Cont. from Fig. 6D

*Fig. 6D Continued*

APPARATUS AND METHOD FOR SYNCHRONIZATION OF MULTIPLE DATA PATHS AND RECOVERY FROM LOST SYNCHRONIZATION

FIELD OF THE INVENTION

The invention relates to digital communications and, more particularly, to systems and methods for synchronizing transmission of data over multiple data paths.

BACKGROUND OF THE INVENTION

In many electronic systems, large amounts of data are often transferred between components in parallel or serial format. Some components across which the data are to be transferred, for example, packet switching devices, can be extremely complex. Oftentimes, because of limitations such as pin count limits, such devices can be more efficiently implemented as multiple relatively small devices that operate in parallel, rather than as a single large device. Consequently, to accommodate this implementation, packets of data can be split into multiple portions, each of which is transferred along a separate parallel processing path to one of the devices. At the output of the devices, the portions of the data packets are reassembled or grouped into the original data packet for further processing.

There are many sources of error in reassembling or grouping the data packet portions into the original data packet. For example, in many systems, it is desirable and/or required that the individual data paths operate a synchronously with respect to each other and independently of each other and also that the grouping device be located a substantial distance from the individual data paths. These factors can result in a system implementation in which there is no real-time communication between the individual processing paths and the grouping device. With no inherent time relationship between portions of the data packets arriving at the grouping device that would identify the portions as belonging together in the same data packet, data packets may be formed by grouping portions that do not belong together. Other factors may also contribute to the possibility of grouping unrelated portions of data packets. For example, errors such as parity errors in one or more of the individual paths, which can be caused by such factors as noise, may result in the loss of a portion of a packet. At the grouping device, it is important to discover such errors to prevent the grouping device from inadvertently replacing the lost portion with a portion of another packet and then incorrectly reassembling the packet.

SUMMARY OF THE INVENTION

The present invention is directed to an apparatus and method for transferring data from a source to a destination which overcomes the drawbacks of the prior art such that portions of data packets formed by splitting a data packet can be reassembled into the data packet such that the number of incorrect data packets forwarded by the system is reduced or minimized. The source device is adapted to receive a plurality of packets of data for transfer to a destination device. For each packet of data to be transferred, the packet of data is split into multiple portions. A first synchronization code is associated with a first portion of the data for each packet, and a second synchronization code is associated with a second portion of the data for each packet. Along a first processing path, a first processor analyzes the first portion of data and the associated first synchronization code for each packet of data to identify a first state associated with the first portion of data for each packet. In one embodiment, a state machine of the first processor and processing path defines the state. For each packet of data, the first portion of data, its associated first synchronization code and the associated first state are stored in a first storage device. A second processor in a second processing path analyzes the second portion of data and the associated second synchronization code for each packet of data to identify a second state associated with the second portion of data for each packet. In one embodiment, this second processor includes a state machine which generates the state from the portion of the packet of data and its associated synchronization code. For each packet of data, the second portion of data, its associated second synchronization code and the associated second state are stored in a second storage device. Next, a third processor, which performs the grouping function, reads from the first storage device one of the first portions of data, its associated first synchronization code, and its associated first state and also reads from the second storage device one of the second portions of data, its associated second synchronization code, and its associated second state. The third grouping processor can analyze the first and second states and the first and second synchronization codes associated with the first and second portions of data, respectively, to determine whether the packet portions were generated from the same packet of data. If they were generated from the same packet of data, then the portions are combined to regenerate the original packet of data.

In one embodiment, if the first and second portions of data were not generated from the same packet of data, then a recovery operation is performed to recover synchronization of the portions of data such that the system can resume correctly grouping packet portions together and forwarding complete packets for further processing. This recovery operation can comprise discarding at least one portion of data. That is, in one embodiment, the system can read packet portions from the individual storage devices and, if it is determined that the portions do not belong together, at least one of them can be discarded. The discarding of packet portions can continue until synchronization is resumed. In one embodiment, where synchronization codes on one of the processing paths or pipes indicate a loss of synchronization, packet portions with their corresponding synchronization codes and states can continue to be read until the synchronization codes indicate that packet portions read from both paths came from the same packet. Then, the portions can be combined into a full data packet, and the packet can be forwarded for further processing. The process of grouping packet portions into full packets is thus realigned or resynchronized, and full packet forwarding resumes.

In one embodiment, the state machines in the individual processing paths or "pipes", referred to herein as "pipe sync state machines" or "pipe state machines" analyze the pattern of synchronization codes for successive portions of data packets being processed in their respective paths to assign an associated state to each portion. The states are then combined with the data packet portion and its synchronization code, and all three items are forwarded together along the path. The synchronization codes can be assigned to portions in a pattern that repeats periodically such that when the grouping device reads the packet portions and associated codes and states, it can determine if the packet portions should be grouped together. In one embodiment, a state machine along one of the paths can detect a discrepancy in the pattern of synchronization codes to identify an error in the data and can in response optionally drop the portion of the data packet. Packet portions can also be dropped within the individual pipes as a result of parity checking.

The grouping processor can also include a state machine which defines a state based on the packet portions read from the storage devices. The grouping processor can also analyze the pattern of synchronization codes associated with successive portions read from the storage devices. Where a discrepancy between code patterns for successive portions is discovered, the grouping processor can determine that an error has occurred and can take steps to ensure that a data packet is not generated by combining the portions that indicate an error. For example, where the states indicate that portions of packets are out of synchronization, the grouping processor can discard data of incoming packet portions as long as the synchronization codes continue to indicate that an error exists. When the synchronization codes are realigned, the grouping processor can resume grouping the portions together in packets and forwarding the packets for further processing. Thus, the system of the invention can detect errors in the forwarding of packet portions and can recover from the error by resynchronizing the data portions with each other.

As mentioned above, the synchronization codes for successive like portions of data packets, i.e., portions of successive data packets stored in the same storage device, are assigned a series of values which repeats periodically. In one particular embodiment, each synchronization code is assigned one of three possible values. By convention, a first value is referred to as a positive, "+," or "A" value. The second value is referred to as a negative, "−," or "B" value. The third value is referred to as a null or idle value. In one embodiment, the A and B values alternate and they are separated from each other by a predetermined number of idle values. For example, a first packet portion can be assigned an A value and the next succeeding three packet portions can be assigned idle values; the next packet portion can be assigned a B value followed by three more idle values which are followed by the next A value.

The pattern of synchronization codes can repeat as packets continue to be received and split for processing through the individual paths. In one embodiment, as a data packet is received at the splitting device, it is split into multiple, e.g., two, portions, and each portion is associated with the same synchronization code value. At the grouping end, when these packet portions are retrieved from the storage device, they can be grouped back together because they have the same synchronization code value.

When the grouping processor determines that a synchronization code and/or a state associated with a portion of a data packet indicates that an error has occurred in the synchronization code sequence, the grouping device can recover from the loss of synchronization such that correct packet portions can resume being properly grouped together into data packets. For example, if one of the portions is associated with an A synchronization code and another portion is an idle or B code, the grouping processor can read and discard packet portions from the side with the idle or B value until another A value synchronization code packet portion is retrieved from that side. The two A packet portions can be grouped together into a data packet, and normal operation can resume for subsequent packets.

The storage devices can be first-in-first-out (FIFO) storage devices. The packet portions, their associated synchronization codes and associated states can be loaded into the FIFOs at one end by the individual path or pipe processors and removed from the FIFOs at the opposite ends by the grouping processor. Hence, an essentially a synchronous communication between the individual processing paths and the grouping processor is established.

Hence, the present invention provides an efficient means for reassembling data packets that have been split for purposes for parallel processing. The invention exploits the fact that it is acceptable to lose a certain small number of data packets on an occasional basis without seriously impacting the overall performance of the system in which it resides. The system does not require that data that exhibits errors be read again in order to allow for correct regrouping. This makes the system applicable in systems where large amounts of data are being transferred at very fast rates and rereading the data would be impracticable. This feature makes the invention applicable in settings where there is an a synchronous relationship among the individual processing paths and also between the processing paths and the grouping device. Because the grouping device has the ability to recognize and recover from data errors by analyzing only the information stored in the storing devices, the grouping device can operate independently of, and without real-time instructions from, the individual processing paths and without transferring any information back to the individual paths. Therefore the grouping function can be performed independently and efficiently and at a location remote from the individual paths.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6B is a schematic timing diagram which illustrates operation of the invention where two missed idle synchronization cycles occur.

DETAILED DESCRIPTION OF PREFERRED EMBODIMENTS

Figure 1:
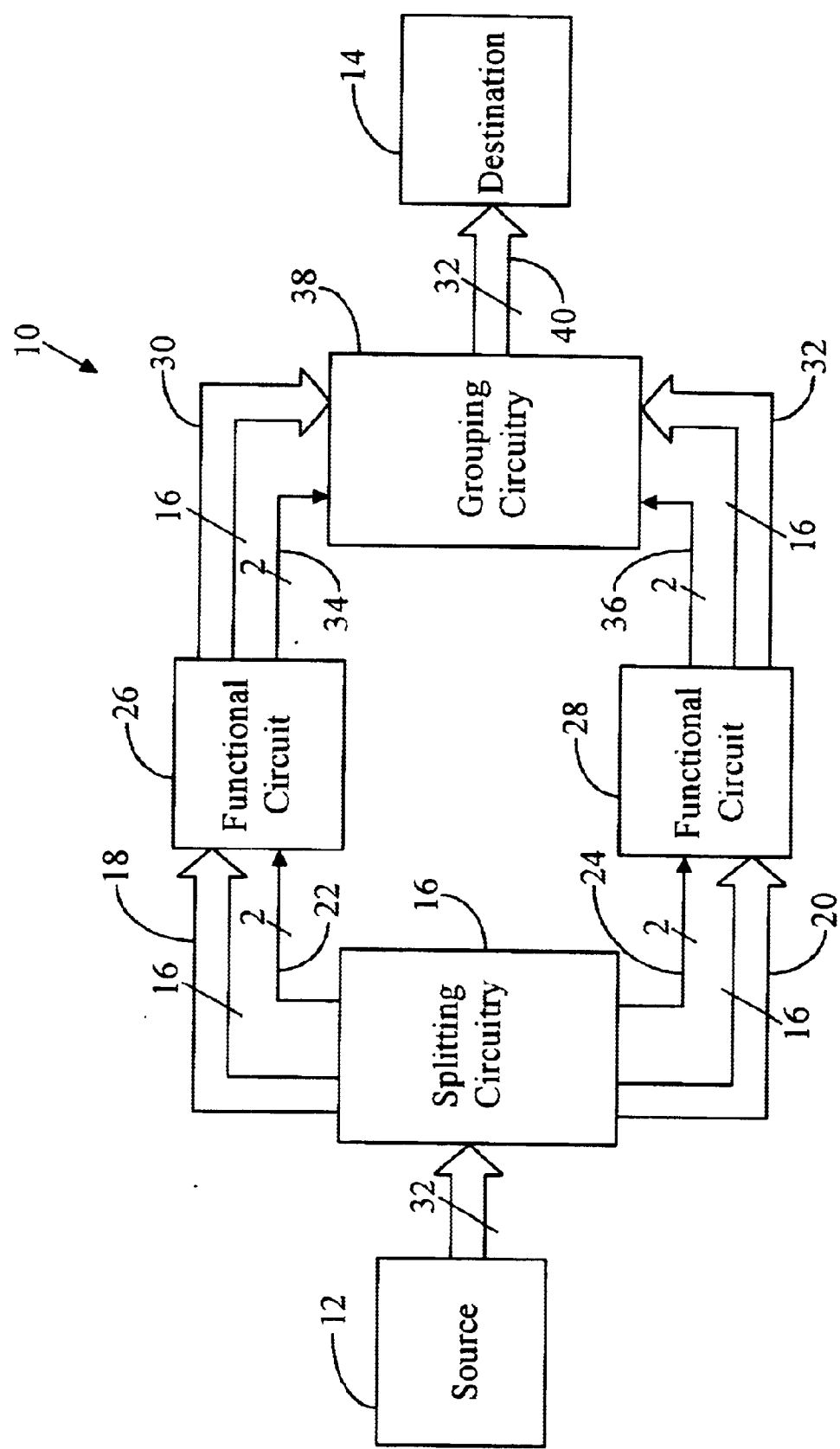
FIG. 1 is a schematic top-level functional block diagram of one embodiment of the apparatus of the invention for transferring data packets from a source device to a destination device by splitting the packets and transferring portions of packets along parallel data paths and then grouping the portion back into their original packets.

FIG. 1 contains a schematic block diagram of one embodiment of the system 10 of the invention used to transfer data. FIG. 1 illustrates an example of transferring 32-bit groups of data from a source 12 to a destination 14. It will be understood that the invention is applicable to data packets of any number of bits.

The 32-bit data packets are transferred to splitting circuitry 16 which splits each of the data packets into two 16-bit portions which are transferred along two respective parallel paths or "pipes" on 16-bit buses 18 and 20 for further processing. The splitting circuitry 16 also generates for each 16-bit portion of the data packet a synchronization code, also referred to herein as a SYNC code or PCODE. In one embodiment, each PCODE can assume one of three possible values. Therefore, each PCODE can be expressed as two binary digits (bits). These synchronization bits, also referred to herein as adjunct bits, that make up the PCODE are forwarded along with their associated portions of the data packets on a two-bit bus 22 and 24, which are referred to herein as adjunct buses. Therefore, as the splitting circuitry splits each data packet into two portions, which are referred to herein as a high portion and a low portion, it also assigns to and couples with each portion a two-bit synchronization code.

After the data packets are split by the splitting circuitry, they can be processed by the circuitry that required that the packet be split. Such circuitry is identified generically in FIG. 1 by reference numerals 26 and 28. For example, the circuitry 26, 28 can be packet switching circuits that cannot be implemented in 32-bit configurations because of pin count limitations. Each functional circuit 26, 28 processes portions of data packets in succession along with their associated two-bit PCODEs and forwards the 16-bit data packets on buses 30, 32 and their associated two-bit PCODEs on adjunct buses 34, 36, respectively. It should be noted that the data buses 18, 20, 30, 32 are shown separate from the adjunct buses 22, 24, 34, 36. This is done for illustration purposes only. In general, each portion of a data packet is transferred together with its two-bit PCODE as a single data group having a data field and a PCODE field.

After processing by the circuits 26 and 28, the packet portions and their associated PCODEs are transferred along the individual paths to the grouping circuitry or "grouper" 38. The grouping circuitry analyzes the PCODEs of incoming packet portions on both sides to determine whether incoming packet portions should be grouped back together into complete 32-bit packets. Regenerated 32-bit data packets are forwarded out of the grouping circuitry 38 to the destination 14 along a 32-bit bus 40.

Figure 2:
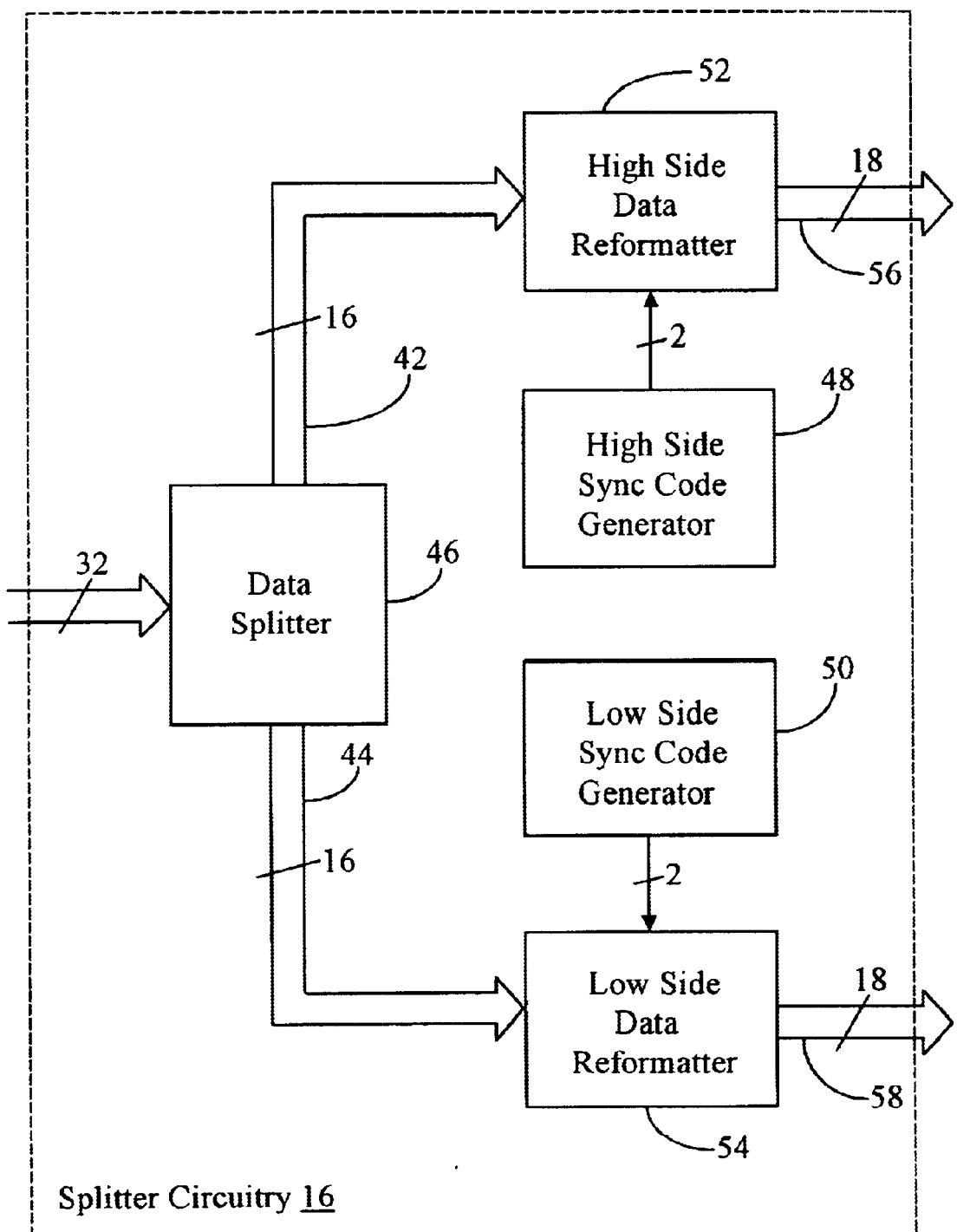
FIG. 2 contains a schematic detailed block diagram of one embodiment of the splitting circuitry in the system of FIG. 1.

FIG. 2 is a schematic block diagram of one embodiment of the splitting circuitry 16 shown in FIG. 1. The 32-bit data packets are received and split into two 16-bit data streams 42, 44 by a data splitter 46. The 16-bit data packet portions are forwarded along their data streams 42, 44 to a high side data reformatter 52 and a low side data reformatter 54, respectively. The data reformatters. 52, 54 add the two SYNC code or PCODE bits to the incoming 16 bits to reformat the data and PCODEs into 18-bit data packages. The SYNC codes added to data packet portions in the high side data reformatter 52 are generated by a high side SYNC code generator 48, and the two PCODE bits added to the low side 16-bit data packet portion are generated by a low side SYNC code generator 50. The 18-bit data packages are forwarded out of the splitting circuitry 16 toward the functional circuits 26 and 28 on 18-bit buses 56 and 58, respectively. It will be noted that the 18-bit bus 56 is the combination of the 16-bit bus 18 and the two-bit adjunct bus 22 shown in FIG. 1. Likewise, the 18-bit bus 58 is the combination of the 16-bit data bus 20 and the two-bit adjunct bus 24 shown in FIG. 1.

Figure 3:
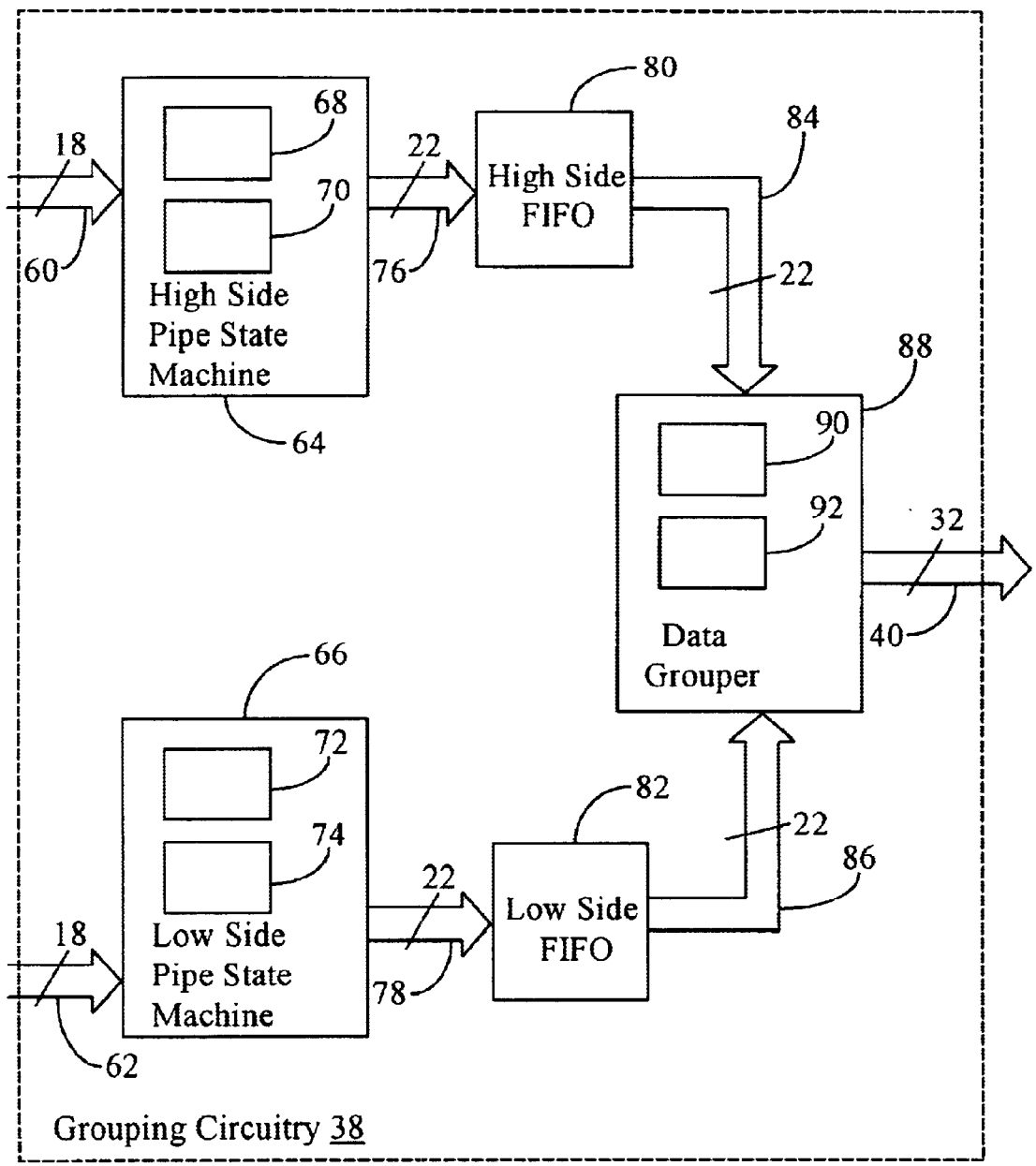
FIG. 3 contains a schematic detailed block diagram of one embodiment of the grouping circuitry shown in FIG. 1.

FIG. 3 is a schematic detailed block diagram of the grouping circuitry 38 shown in FIG. 1. The high packet portion is received at the circuitry 38 on an 18-bit bus 60, and the low packet portion is received on the 18-bit bus 62. These 18-bit portions include the 16-bit data portion of the original data packets and the two-bit PCODE associated with each data portion. It should be noted that the 18-bit bus 60 includes the 16-bit data bus 30 and the two-bit adjunct bus 34 shown in FIG. 1. Likewise, the 18-bit bus 62 includes the 16-bit data bus 32 and the two-bit adjunct bus 36 shown in FIG. 1.

The grouping circuitry 38 includes pipe state machines 64, 66 which receive the 18-bit packet portions on the buses 60 and 62, respectively. The 18-bit data and PCODE on bus 60 are applied to the high side pipe state machine 64, and the 18-bit data and PCODE on bus 62 are applied to the low side pipe state machine 66. It will be understood that the grouping circuitry 38 includes as many pipe state machines as there are individual paths or pipes passing data packet portions. That is, if data packets are split into N packet portions, then the grouping circuitry 38 includes N pipe state machines.

The pipe state machines 64, 66 include processors and associated circuitry, indicated by 68 and 72, respectively. The processors 68, 72 analyze their respective incoming packet portions and assign a state to each packet portion. The state machines 64, 66 assign a state based upon the patterns of PCODEs being received per packet portion at each state machine. The states assigned to the packet portions are determined by the pattern of PCODEs received at the individual state machines. The state assigned to each packet portion can be represented by multiple binary bits. These bits are combined with the 18-bit incoming data and PCODE word to generate a new output data package. To that end, each state machine 64, 66 includes a data reformatter 70 and 74, respectively, which generates the new data package which includes 16 bits of data, a two-bit adjunct PCODE and a state code. In the embodiment shown in FIG. 3, the state code is expressed by four bits. Therefore, the reformatted data package is, in this embodiment, 22 bits wide. Hence, the reformatted data package is output from the state machines 64, 66 on 22-bit buses 76 and 78, respectively. The 22-bit words are stored in first-in-first-out (FIFO) storage devices 80 and 82. High-side 22-bit packages are stored in the high-side FIFO 80, and low-side 22-bit packages are stored in the low-side FIFO 82.

The data grouper 88 reads packet portions from the high-side FIFO 80 and the low-side FIFO 82 and determines whether they should be recombined into a full 32-bit data packet. A processor and its associated circuitry 90 in the data grouper 88 analyze the PCODE and state code associated with each 16-bit data packet portion to determine whether the high-side data packet portion should be recombined with the low-side data packet portion into a single 32-bit packet. If they should be recombined, then a data reformatter 92 combines the two 16-bit packet portions into a single 32-bit packet which is forwarded to the destination on 32-bit bus 40.

The processor 90 analyzes the pattern of PCODEs associated with the incoming data packet portions as described below in detail to determine whether packet portions should be grouped together. The data grouper 88 can determine, by analyzing PCODEs and/or associated pipe state machine states as they are read out of the FIFOs 80, 82, whether an error has occurred in the transfer of data packet portions. This can be done without any direct communication with the individual pipe state machines 64, 66. That is, the data grouper, by analyzing the information previously encoded and stored with the data and the state code passed on from the pipe state machines, can, at a later time, without direct communication to or from the individual pipe processing circuits or state machines, determine whether previously stored packet portions should be grouped back together again.

The data grouper 88 is capable of recognizing an error and, as described in below in detail, recovering from that error. The recovery process can include discarding packet portions from one of the pipes while waiting for the two pipes to realign with each other. The presence of an error and recovery therefrom are detected and verified by the data grouper's analysis of the incoming PCODEs and/or state codes associated with the incoming packet portions.

The details of detecting errors by analyzing SYNC codes (PCODEs) and recovering from those errors, in accordance with one embodiment of the invention, will now be described in detail. The pipe state machines 64, 66 track the state of the individual data streams as the individual packet portions are forwarded through them. The grouping function, as described below in detail, monitors the state of the pipe state machines as they existed when packet portions were processed by them and makes decisions on which data packets are properly reassembled and passed on. The individual pipe state machines function autonomously, that is, the grouping function does not send any decisions or status back to the pipe state machines.

As described above, the error detection and recovery of the invention and the functioning of the pipe state machines depends upon the PCODEs associated with each of the portions of each data packet. In one particular embodiment described herein, there are three PCODEs used, with an extra unused PCODE. Table 1 illustrates the bit assignments for the four possible bit codes.

TABLE 1

| PCODE [1] | PCODE [0] | Function |
|---|---|---|
| 0 | 0 | PEXTDST |
| 0 | 1 | PSYN_P |
| 1 | 0 | PSYN_N |
| 1 | 1 | PIDLE |

There are two PCODE bits, labeled 1 and 0. PEXTDST, PCODE=00, is an extra code which can be used in connection with system functions unrelated to the synchronization of the invention. The code PSYN_P, code 01, is referred to as a positive SYNC code. The code PSYN_N, code 10, is referred to as a negative SYNC code; and code PIDLE, code 11, is referred to as an idle code. In one embodiment, the splitting circuitry assigns these codes to the split portions of the data packets in succession. The positive and negative codes are assigned in alternating fashion and are separated from each other with a predetermined number of PIDLE codes.

When a packet is split by the splitting circuitry, each packet portion is assigned the same SYNC code. For example, a first packet can be split into two portions and each of the portions can be assigned a positive SYNC code. The next three packets will be assigned PIDLE codes. The next packet will be assigned a negative SYNC code. Next, three PIDLE codes will be assigned and then a positive SYNC code will be assigned. This pattern continues repeating as packets are split and forwarded through the individual pipes. These PCODE bits are output on the adjunct bus which is coupled with the data bus as described above.

In an alternative embodiment, a "full" PCODE encoding scheme is applied. In this alternative approach, five bits are used for each PCODE instead of two. An advantage of these expanded values is that they allow for greater error detection capability. For example, the loss of two or more PSYN values can be detected and/or recovered from. Table 2 lists the PCODEs used in the full encoding scheme and their functions.

TABLE 2

| PCODE (or DST) [4:0] | Function | Description |
|---|---|---|
| 00000 | PEXTxxx | Reserved (indicates an extended encoding and thus is only used on abbreviated encoding streams like the PEXTDST) |
| 00011 | PIDLE | No pipe sync function implied; the action depends on the state of the receiver. For example, if a receiver believes it is in sync, it can accept data. If it feels it has lost sync, it will discard cycles with this encoding. |
| 00100 | PFLUSH | A flush action is requested. |
| 00101 | PWAIT | In a master/slave pipe state machine configuration, this code indicates to the slave that it should forcibly enter a wait state for a PSYN_P signal. |
| 00110 | PSTOP | The receiver on the other end of the link has lost Link Sync, and is requesting that this transmitter stop sending data and initiate a Link Sync protocol. |
| 10000 | PSYN_P | Positive (+) PSYN cycle (same as 'nnnn' == 0 for PSYN_I). |
| 10001 | PSYN_N | Negative (−) PSYN cycle (same as 'nnnn' == 1 for PSYN_I). |
| 1nnnn | PSYN_I | A more generic description of the PSYN functions. When bit [4] is a '1', the rest of the bits represent an integer value for sync cycles. The PSYN_P and PSYN_N are values 0 and 1 in this encoding space. This definition allows for future expansion into a larger scheme for synchronization, but includes two-values + and −. |
| all others | reserved | All other values are reserved. |

The pipe sync state machines work in concert with the rest of the grouping circuitry 38, particularly the data grouping processor 90, which implements the grouping state machine. Once proper synchronization has been lost, the grouping state machine will ensure that data portion coming from both pipe state machines, i.e., the high and low pipe state machines 64 and 66, return to synchronization.

Each of the pipe state machines 64, 66 is associated with at least three counters, namely an idle state counter, a SYNC counter, and a WAS_OK counter. These counters and their association variables are defined in Table 3 below.

TABLE 3

| Counter | Function |
|---|---|
| IDLE_CNT | Counter that is incremented for each time a PIDLE is received when in either DATA_OK_? state. This counter is not used in this state machine, rather it is |

TABLE 3-continued

| Counter | Function |
|---|---|
| | exported for use by the grouping function. IDLE_CNT is 0 when not in either DATA_OK_P or DATA_OK_N. |
| SYNC_CNT | Used to determine when 2 or more valid syncs in a row have been received. 0 when leaving any SYNC_WT_? state, or when an unexpected PSYN_? is received (i.e., if waiting for a "+" and received a "−", or waiting for a "−" and received a "+". Incremented when a valid (expected) PSYN_? is received in states SYNC_WT_?. Not incremented in any other state. |
| WAS_OK | This bit is used by the state machine to ensure a sequence of either "+", "−", "+" or "−", "+", "−" has been seen. Absent the use of this bit, an entire sequence of "+", "−", "+", "−" would be necessary every time. While this may not seem to be wasteful, it would be if the extended PCODE encodings where there are more than just "+" and "−" codes were used they would all have to be cycled through for every sync recovery. 0 = Have never achieved sync (DATA_OK_?) since the last reset/flush, so do NOT go to DATA_OK until the entire wait sequence has finished (i.e., continue through SYNC_WT_P2 before going to DATA_OK_P. 1 = Have reached sync once already, so it's ok to go to DATA_OK_N from the SYNC_WT_N2 state. |

The Pipe Sync state machines 64, 66 each also maintain at least two pipe sync state machine configuration bits. They are the AUTO_FLUSH configuration bit and the FORCE_PSYN_P configuration bit. These are described in detail in Table 4.

TABLE 4

| Configuration Bit | Function |
|---|---|
| AUTO_FLUSH | Used to force the FLUSH state after various errors. This can be used to signal to downstream receivers that states have changed drastically, but the right to disable it in case it has undesirable effects is reserved. 0 = Most "unrecoverable" errors will cause a transition to the HALT state. 1 = Most "unrecoverable" errors will cause a transition to the FLUSH state, which will reset enough status that processing data can continue. |
| FORCE_PSYN_P | Used to force the pipe sync state machine to the DATA_OK_P state for cases where PCODES are not being sent from the upstream transmitter. 0 = Take the normal transition from EMPTY or FLUSH to SYNC_WT_NT which means data is not accepted until some PSYN_? characters are received. 1 = Go directly from EMPTY or FLUSH to DATA_OK_P. This disables the pipe sync function completely. The transition from DATA_OK_P to DATA_OK_N will never occur. |

Figure 4:
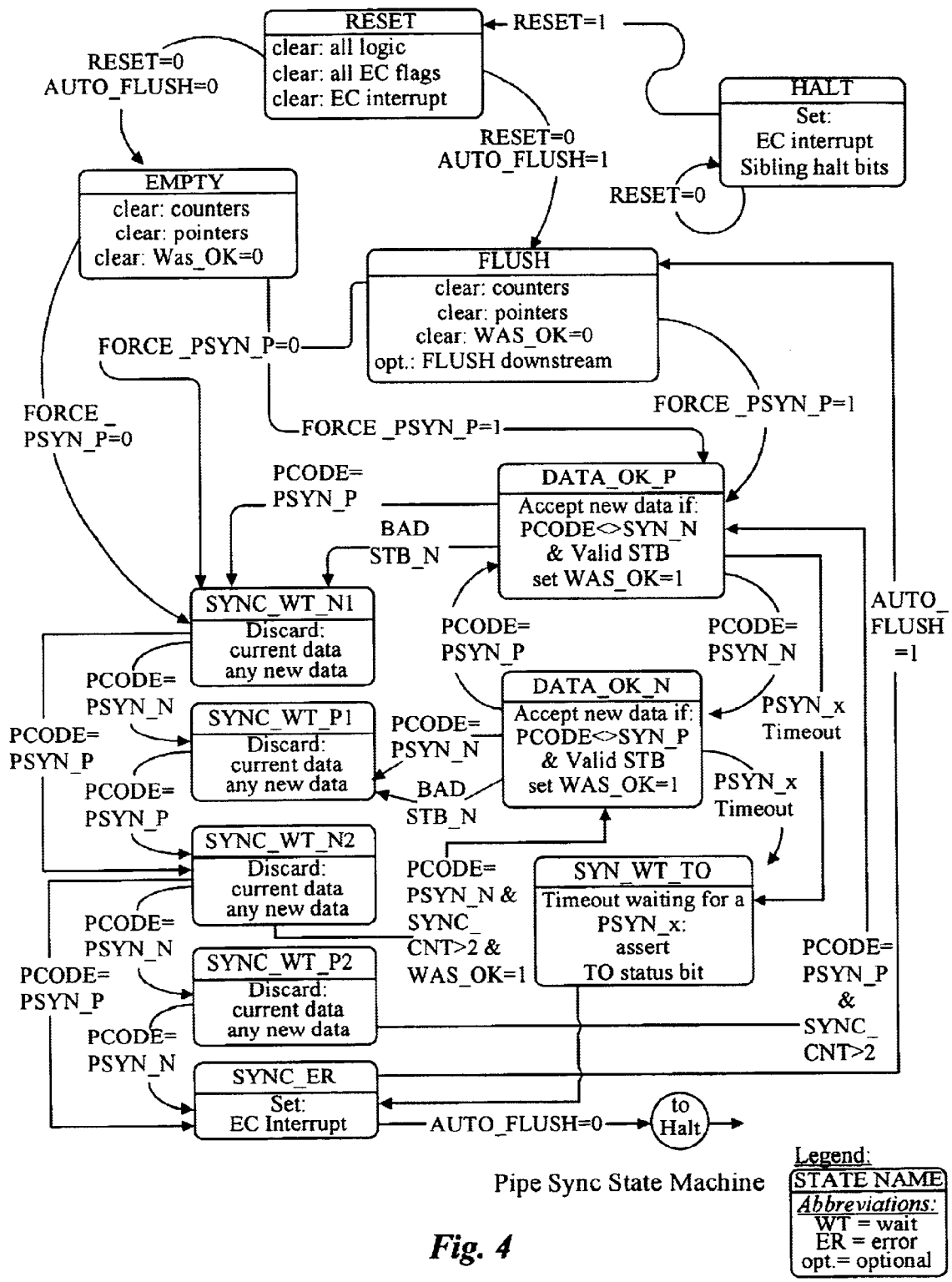
FIG. 4 contains a schematic state diagram illustrating the states of a pipe state machine used in one embodiment of the invention.

FIG. 4 contains a schematic state diagram which describes the operation of each of the pipe sync state machines 64, 66. Referring to the state diagram of FIG. 4, a PCODE equal to PFLUSH forces a transition to the FLUSH state from all states except for the HALT state. There are several programmable bits that affect state transitions. PSYN_x Timeout is an optional external counter. AUTO_FLUSH is a programmable mode that allows automatic operation without microprocessor intervention. SYNC_CNT is a counter used only in SYNC_WT_?? states which counts expected positive/negative sync cycles. The occurrence of either polarity cycle will increment the SYNC_CNT counter. IDLE_CNT is the number of idle cycles received since the last SYNC character. It is not used in the pipe sync state machines but is exported for use in the grouping function. WAS_OK is a Boolean indicator of whether the machine has been in the DATA_OK_? state since the last FLUSH/EMPTY.

Table 5 describes in detail the state diagram of FIG. 4. The table lists each of the states and the conditions under which operation passes into and out of each of the states.

TABLE 5

| State | Operation |
|---|---|
| RESET | Clears all embedded controller (EC), i.e., microprocessor, status flags. AUTO_FLUSH=1 will cause a transition to FLUSH after this state. |
| EMPTY | Clears all counters and pointers. Doesn't clear any bit associated with the EC status, in case previous errors have not been read yet. |
| FLUSH | Clears all counter, pointers, and sends a PFLUSH downstream (if not disabled via configuration bits). This won't clear EC status bits that indicate previous errors; only RESET will do that. |
| DATA_OK_P, DATA_OK_N | Accepts data and passes it downstream. Increments the IDLE_CNT counter for use by the Grouping Function. When switching from DATA_OK_P to DATA_OK_N (or vice versa), the IDLE_CNT is reset to 0. |
| SYNC_WT_N1, SYNC_WT_P1 | First stage of attempting to regain synchronization after an error, e.g., incorrect data strobe (STB_N), parity error on the pipe codes, etc. Neither of these states will go back to the DATA_OK_? states- It is preferable to have more than 1 valid sync before assuming all is ok. The SYNC_CNT counter is incremented if the correct polarity of sync is received; if an incorrect polarity is received, we go to SYNC_ERR (that's two sync errors in a row). PIDLEs are ignored in this state, and data is discarded. |
| SYNC_WT_N2, SYNC_WT_P2 | The second stage of waiting for sync characters. By checking the value of SYNC_CNT, can ensure that state goes to the respective DATA_OK_? state only if receive 2 correct sync characters in a row. |
| SYNC_WT_TO | This is a sync character timeout state. The pipe sync state machine doesn't perform this count, it jumps to this state if an external timer notices that haven't been in DATA_OK_? within a timeout period. If no external timer exists, the PSYN_X_Timeout signal mentioned should be deasserted (=0). |
| SYNC_ER | This state is only reached after a sync error has been discovered. It sets appropriate status bits and jumps either to HALT (AUTO_FLUSH=0) or FLUSH (AUTO_FLUSH=1). The EC should monitor the status bits associated with the pipe sync state machine. |
| HALT | This state prevents data from being passed on. It is used to ensure that errors are detected and bad data not passed (i.e. if it is decided that the errors cannot be corrected by a FLUSH, or if it is desired to stop data flow on error). The HALT state has its own error indicator in the status bits. |

Referring to FIG. 4 and Table 5, the pipe sync state machines track the repeating sequence of the "+" (PSYN_P) and "−" (PSYN_N) characters, with PIDLEs in between. The two states DATA_OK_P and DATA_OK_N are maintained when the sequence appears to be correct. When a state other than DATA_OK_? (? representing P or N) is encountered, downstream entities such as the grouping function of the invention described herein in detail should discard the data they receive from both pipes. In general, since close to the same amount of data is received from both pipes, when either one leaves the DATA_OK_? state, then data from both should be discarded.

In accordance with the invention, states and variables associated with the pipe state machines will now be described.

1. AUTO_FLUSH, RESET, FORCE_PSYN-P

These inputs are assumed to be static, i.e., they are external inputs from an EC (embedded controller, e.g., a microprocessor). They are not central to the operation of the pipe sync state machine, rather they allow for tailoring of its operation—such as an automatic flush of FIFOs after an error has occurred, etc. The FORCE_PSYN_P bit allows the functionality of the pipe sync state machine to be turned off in cases where the source does not produce any PSYN characters at all.

2. PSYN_x Timeouts

This operation provides the system with the convenience of a hardware-generated timeout mechanism. This can be used to automatically inform the EC that data has not passed through this pipe in a long time, indicating that something upstream from the pipe sync state machine is probably experiencing failure.

HALT, FLUSH, SYNC_ER, SYN_WT_TO

These states represent actions resulting from error conditions. They are not part of the normal operation of the pipe sync state machine. The SYN_WT_TO represents an optional timeout indicator. The FLUSH state is used only if the AUTO_FLUSH input is asserted (=1); it serves to provide automated error recovery by discarding an entire input stream much like a system reset.

4. DATA_OK_P, DATA_OK_N

These are the only states in which data should be passed on by downstream devices. If a pipe sync state machine is not either of these states, it has either:

1) never reached proper synchronization, or 2) lost synchronization via missing PSYN_? codes.

It should be noted that this state does not explicitly count the PIDLE characters for its operation—the process still works whether or not the pipe sync state machine "knows" how many PIDLEs are expected. The only requirement is that the number of PIDLEs between the other PSYN_? characters is the same on all busses that are being split.

5. Valid Cell

This input is used to validate the PSYN characters. Cells that have a parity error in their PCODE, etc., should not be acted upon. An invalid cell, therefore, causes the machine to enter the resync states.

6. SYNC_WT_N1; SYNC_WT_P1, SYNC_WT_N2, SYNC_WT_P2

These four states represent the tracking of PCODEs performed when it has been decided that sync has been lost. The WAS_OK bit is used here to allow the state SYNC_WT_N2 bypass the last SYNC_WT_P2 state if the machine was previously in DATA_OK_?. This is a shortcut to the proper DATA_OK state, but it allows fewer cells to be dropped if implemented. All of these states increment the SYNC_CNT counted when a valid transition is found.

The following description traces the action of one embodiment of the pipe sync state machine in normal operation.

1. RESET The system is reset.
2. EMPTY The pipe sync state machine starts up on an empty pipe. The purpose here is to initialize pointers and clear the WAS_OK=0.
3. SYNC_WT_N1 The pipe sync state machine will wait until it sees a PSYN_N character.
   There are three situations that may occur now:
   1.) PSYN_N is received—this is what is expected, so proceed to the SYNC_WT_P1 state.
   2.) a PIDLE is received—remain in this state.
   3.) A PSYN_P is received. In this state, this is not an indication of an error—the wrong character may have been picked to look for first. Skip down to SYNC_WT_N2 and wait for a PSYN_N.
4. SYNC_WT_P1 Waiting for a PSYN_P character. There are two actions that may need to be performed.
   1.) PSYN_P is received—move on to SYNC_WT_N2 and wait for a PSYN_N.
   2.) PSYN_N is received—this indicates an error since two PSYN_N characters have now been received in a row (either from state SYNC WT_N1 or DATA_OK_N). The. next state transition will be to SYNC_ER, since it is important to indicate to the system that we demonstrate the detection of multiple sync errors. Remember, we got here either from RESET/FLUSH (SYNC_WT_N1) or DATA_OK_N, and then received two PSYN_N characters in a row—something must be wrong. Failure to follow case (2) to SYNC_ER would mask multiple missing PSYN_P characters.
5. SYNC_WT_N2 Waiting for a second PSYN_N character. There are several possible cases, but the SYNC_CNT is used here. The idea is that we do not consider the sync valid unless we see at least a "−", "+", "−" or a "+", "−", "+" sequence. This is indicated by a SYNC_CNT (of valid states) greater than 2.
   1.) The transition marked with the text "(PCODE= PSYN_N & SYNC_CNT>2 & WAS_OK) is an optimization that allows bypass of the SYNC_WT_P2 state if previously were in DATA_OK_P. This optimization is "safe" and it allows less data to be dropped.
   2.) PSYN_N received, by the SYNC_CNT is two or less. Must go to SYNC_WT_P2 to ensure we get three valid sync transitions in a row.
   3.) Received two PSYN_P characters when already out of sync. Report an error by going to the SYNC_ER_state.
6. SYNC-WT_P2 Either get a valid PSYN_P character here or go to SYNC_ER. The check for SYNC_CNT>2 makes sure any of the previous optimizations did not violate the requirement of three valid syncs in a row.

Figure 5:
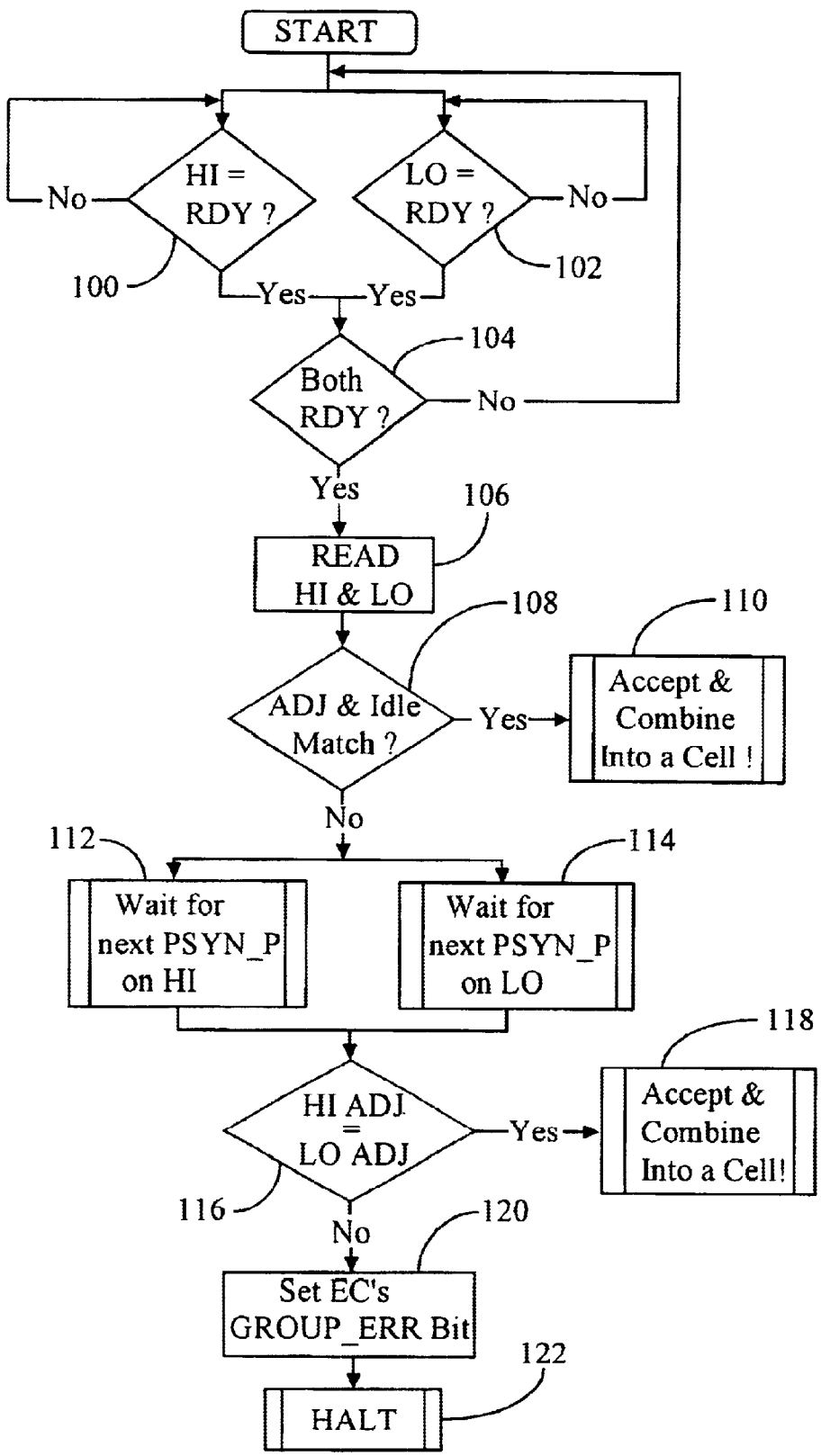
FIG. 5 contains a schematic flow chart illustrating one embodiment of the logical flow of the grouping function in accordance with the invention.

FIG. 5 is a schematic flow chart which illustrates the logical flow of the grouping process performed by the grouping circuitry 38 in accordance with one embodiment of the present invention. In step 100, the high pipe side is checked to determine if it is ready. If it is, flow passes to step 104. In step 102, it is determined whether the low pipe side is ready. If it is, flow continues to step 104.

In step 104, it is determined whether both sides are ready to proceed. If not, flow returns back to the start. If both sides are ready, then flow passes to step 106 where the high and low side data packets, including, in the exemplary embodiment, 16 bits of data, two bits of synchronization code and four or more bits of pipe state code, are read from their respective FIFOs 80, 82. In step 108, it is determined whether the adjunct (synchronization) ADJ codes of both sides match. It is also determined whether the Idle count (IDLE_CNT) associated with each of the high and low sides of the data packages match. If these two conditions are met, then in step 110 the two data packages are accepted. The data reformatter 92 combines the 16-bit portions of both packages into a single cell or data packet. The packet can then be forwarded out of the grouping circuitry 38 for further processing.

If in step 108 it is determined that both conditions are not met, then the grouping circuitry 38 enters a waiting condition. Specifically, depending upon the condition, in step 112, the grouping circuitry 38 can wait for the next PSYN_P on the high side, or, in step 114, it can wait for the next PSYN_P on the low side. During these wait conditions, data being examined can be discarded while waiting for the sync codes to match. When one of these conditions is met, flow continues to step 116 where the high side adjunct (synchronization) bits are compared to the low side adjunct (synchronization) bits. If they are equal, then, in step 118, the data portions of the high and low side data packages are combined into a single data packet or cell and are forwarded for further processing. If the conditions of step 116 are not met, then the EC's GROUP_ERR bit is set to indicate an error in the data. The processing ends in step 122.

Figure 6A:
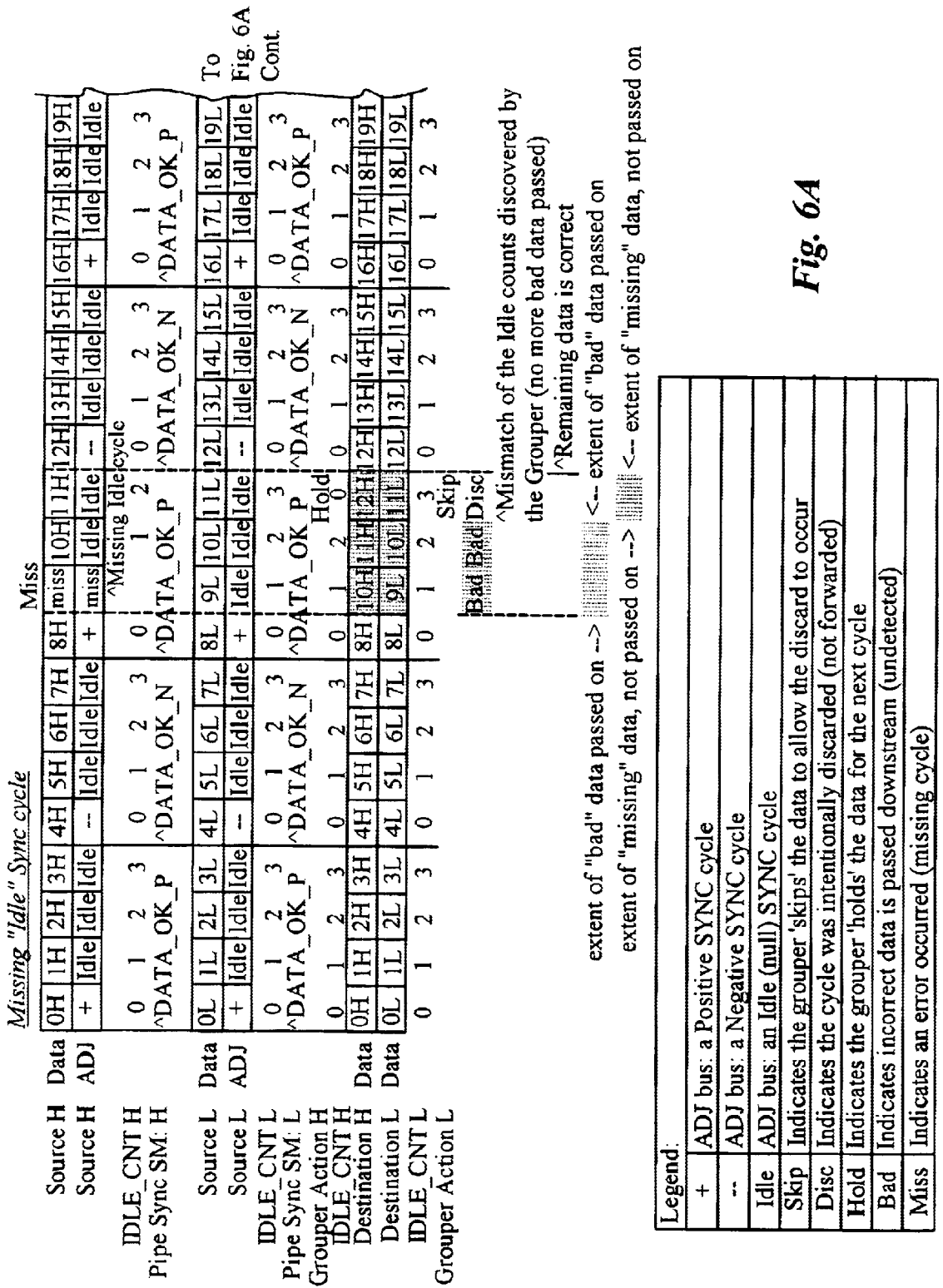
FIG. 6A is a schematic timing diagram which illustrates operation of the invention where a missed idle synchronization cycle occurs.
Figure 6B:
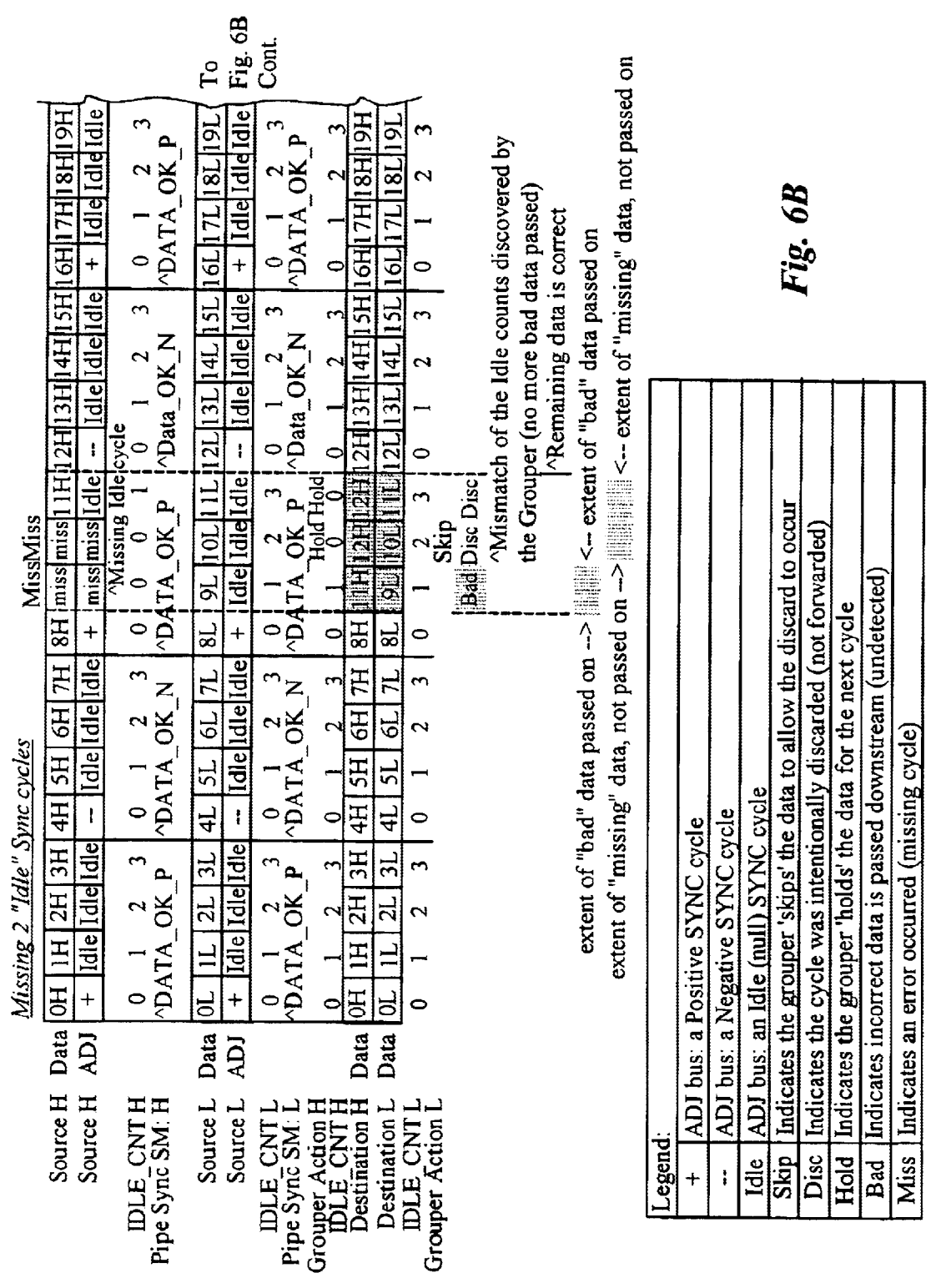
Figure 6C:
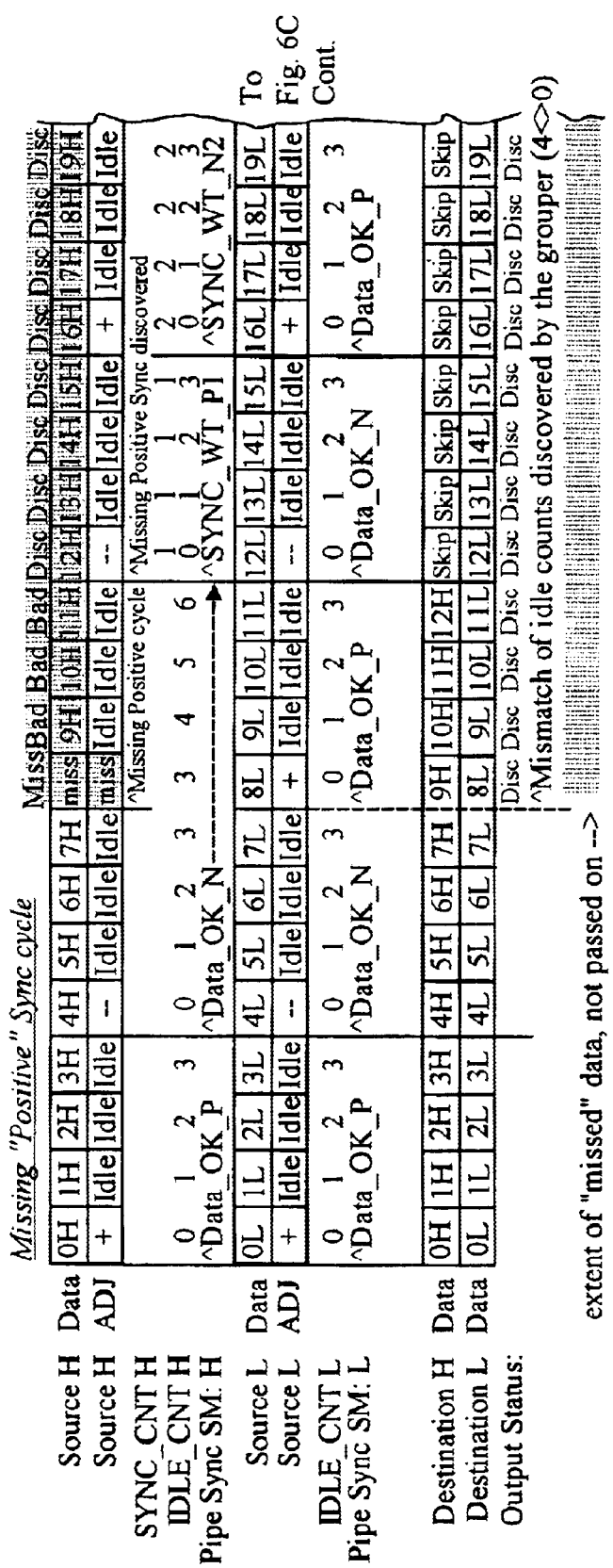
FIG. 6C is a schematic timing diagram which illustrates operation of the invention where a missed positive synchronization cycle occurs.
Figure 6D:
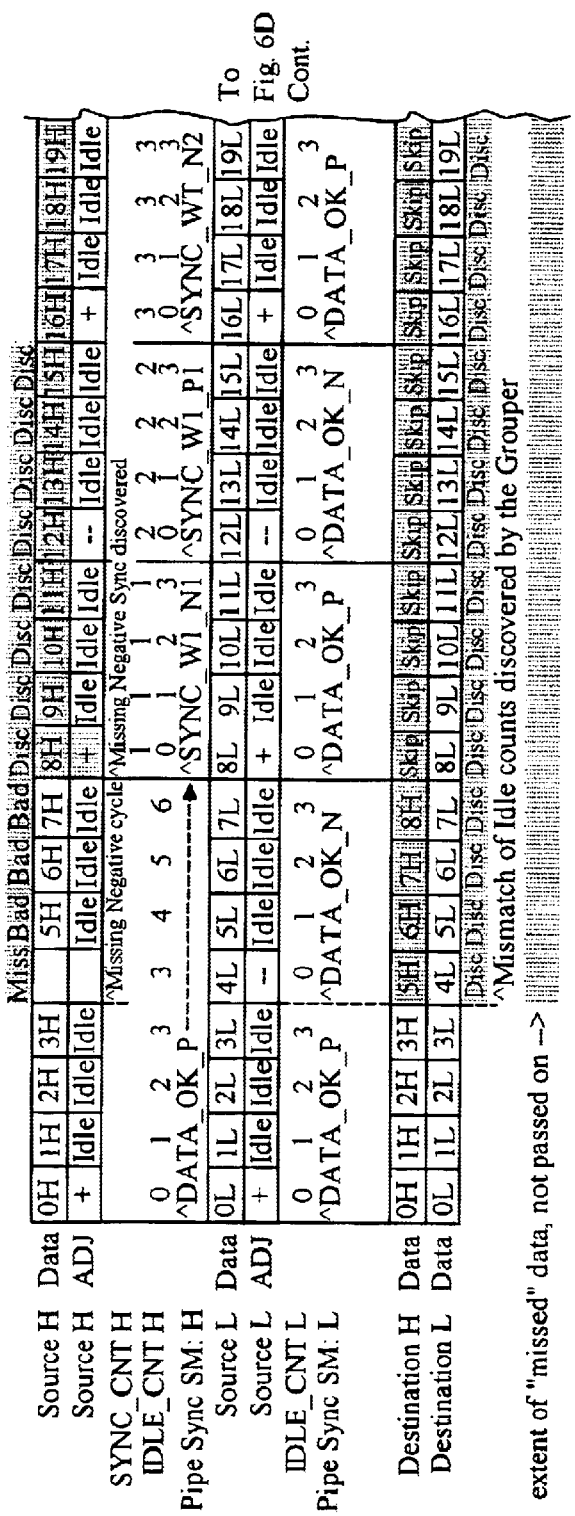
FIG. 6D is a schematic timing diagram which illustrates operation of the invention where a missed negative synchronization cycle occurs.

FIGS. 6A–6D contain schematic example timing diagrams which illustrate the data grouping process in accordance with one embodiment of the invention. The four figures illustrate four different examples of error conditions and recovery operations in accordance with the invention. The timing diagram of FIG. 6A illustrates the condition in which data packages being read by the grouping circuitry 38 from the individual pipes miss an Idle cycle on one of the sides. FIG. 6B illustrates the same conditions as FIG. 6A, except that two Idle cycles are missed instead of one. FIG. 6C indicates a condition in which one of the sides misses a Positive synchronization code cycle. FIG. 6D illustrates a condition in which a Negative synchronization code cycle is missed.

Each of the timing diagrams of FIGS. 6A–6D illustrates the data being read by the individual pipes (Data), the synchronization or adjunct code associated with each data portion (ADJ), the Idle count (IDLE CNT) variable value associated with the packet portion and the pipe sync state machine state (Pipe Sync SM) associated with the packet portion, which is determined from analysis of the adjunct codes. Each diagram also illustrates how the grouping-circuitry processes the individual data packet portions. The high side data labeled as Source H Data is shown as a series of packet portions labeled 0H, 1H, 2H, etc. The corresponding synchronization codes or adjunct codes are labeled Source H ADJ and are shown as a series of alternating Positive and Negative codes, each pair separated by three Idle sync codes. The timing diagram also indicates the Idle count value associated with the packet portions, labeled IDLE_CNT H, as well as the state of the pipe sync state machine associated with each packet portion, labeled Pipe Sync SM: H. For the low side, the data packet portions are labeled in sequence as 0L, 1L, 2L, etc. The adjunct codes for the low side follow the same pattern as the codes for the high side. The Idle count for the low side is indicated by IDLE_CNT L, and the pipe sync state machine states for the low side are indicated by Pipe Sync SM: L.

As shown in FIGS. 6A–6D, for each full packet, the packet is split into a high portion and a low portion, and each portion is assigned the same synchronization code. The individual packet portions are numbered in the timing diagrams such that packet portions generated from the same packet have the same number. That is, for example, the high side portion of the fourth data packet is labeled 3H, and the low side of the same data packet is labeled 3L. The final grouped output data, regenerated from the grouping circuitry 38, is indicated in the third line of each timing diagram. Actions taken by the grouper 38 with respect to high-side data and low-side data are labeled Grouper Action H and Grouper Action L, respectively. The Idle counts read by the grouper are labeled IDLE_CNT H and IDLE_CNT_L. Also, high and low data packet portions intended for the destination; if any, are labeled Destination H and Destination L, respectively. For example, the first entry in the grouped packet time line shows that the 0H and 0L packet portions are grouped together by the grouping circuitry 38 to generate a correct full data packet denoted OH/OL.

FIG. 6A illustrates an example of the grouping and synchronization recovery process of the invention for a case in which an Idle code is missed on one side. Referring first to FIG. 6A, as shown, the grouping circuitry 38 reads the individual packet portions from the high side and the low side and their corresponding adjunct or synchronization codes in succession. For the first nine cycles numbered 0 through 8, since no errors occur and no data portions are lost, and since the adjunct code patterns match on both the high and low sides, the grouping circuitry 38 combines the corresponding data packet portions into full packets and forwards them to the destination.

As shown in the example of FIG. 6A, the high side packet portion 9H is missed. That is, for some reason it was not properly stored in the high side FIFO 80. The packet portion may have been lost for reasons such as noise in the pipe or it may have been dropped intentionally due to some form of bit error such as a parity error. Instead of reading the 9H packet portion, the grouping circuitry 38 reads the 10H portion with its corresponding Idle adjunct code, since it was the next item stored in the high side FIFO 80. In one embodiment, the Idle code does not change the state of the high side pipe state machine 64. Therefore, both sides are still in the DATA_OK_P state, and, as a result, the error is not yet detected. Therefore, the grouping circuitry 38 combines the 9L low side packet portion with the 10H high side packet portion and forwards this incorrectly generated packet, designated 10H/9L, to the destination.

In the next step, the grouping circuitry 38 reads the 10L packet portion and its corresponding Idle state and the 11H packet portion and its corresponding Idle state. Since no error has yet been detected, those two packet portions, namely, 10L and 11H, are combined in an incorrect data packet 11H/10L which is forwarded to the destination. Next, the grouper 38 reads the 12H high side packet portion and its corresponding Negative sync code and the 11L low side packet portion and its corresponding Idle sync code. At this point, the grouper 38 recognizes a state change in the high side pipe to the DATA_OK_N state and notes that the state on the low side has remained in the DATA_OK_P state. Because the high and low sides are in different states, the grouper 38 enters a hold condition in which it waits for the states to realign. During the hold, the grouper discards data packet portions read from the side that is due for the state change. In this example, the 11L packet portion read from the low side is discarded. As a result, the bad data packet 12H/11L is not forwarded to the destination.

Next, the grouping circuitry 38 reads the 12L portion from the low side and its corresponding Negative sync code, which indicates a change in state to the DATA_OK_N state. Here, the grouper 38 recognizes that the two pipes are back in the same state, and it resumes regeneration and forwarding of complete packets. The 12H/12L packet is forwarded for further processing.

Hence, the two pipes are realigned, and processing can continue. In this case, i.e., the case of a single missing Idle sync code, only two bad data packets are forwarded, and one packet is discarded.

FIG. 6B illustrates the case in which two Idle sync codes are missed. The packet portions 9H and 10H and their corresponding Idle codes are missed. The grouper 38 reads the 11H and 9L packet portions and groups them together and forwards a bad packet 1H/9L. Next, the grouper 38 reads 12H and 10L and notes the state change in the high side to DATA_OK_N. The grouper 38 enters the hold condition in which it continues to read packet portions from the low side waiting for a state change. It forwards no more bad data packets but begins reading and discarding low-side packet portions. The 10L low-side packet portion is read and discarded. Next, the grouper 38 reads the 11L packet portion without reading another portion from the high side. Again, since a state change has not occurred on the low side, the hold continues and the 11L portion is discarded. Finally, when the 12L portion is read, the grouper detects the state change in the low side to the DATA_OK_N state. Since the high and low states are again the same, the grouper 38 leaves the hold condition and resumes forwarding packets to the destination with the 12H/12L packet.

Referring to FIG. 6C, the condition in which a missed Positive sync cycle is illustrated. In this case, the individual pipe recognizes a failure in the +, −, + or −, +, − sequence and performs a recovery. This is in contrast to the cases described above in which the grouper 38 recovers from missed Idle codes. As shown in the ninth cycle, the high side data portion 8H and its corresponding Positive sync cycle are missed by the high side pipe. The grouping circuitry 38 reads the high side 9H data portion and its corresponding Idle code. The grouping circuitry 38 reads the low portion 8L and its corresponding Positive sync code. In this case, in contrast to the cases of FIGS. 6A and 6B in which Idle states are missed, the grouping circuitry 38 immediately discovers the error due to the difference in pipe states and/or Idle counts. Upon reading the low side data 8L and the Positive sync code, the state of the low side pipe state machine is indicated as being in the DATA_OK_P state. At the same time though, the high side state remains in the DATA_OK_N state because a Positive sync was not received to change the state. This mismatch can indicate to the grouping circuitry that the error has occurred. Also, at this point, the Idle counts IDLE_CNT variables of the individual pipes are different. In the high side, the IDLE_CNT_H is 4 and the low side Idle count IDLE_CNT_L is 0. Because of this mismatch, the grouping circuitry 38 does not forward bad data, but, instead, discards the 9H/8L data packet. This continues for three more cycles, i.e., the incorrect 10H/9L, 11H/10L and 12H/11L full packets are discarded in sequence.

In this case, i.e., where a Positive or Negative sync code is missed, the individual pipe notes the error and performs a recovery. The recovery involves waiting for the +, −, + or −, +, − sync code sequence to resume. In the meantime, the pipe passes through a sequence of states during the waiting process. To illustrate, referring to FIG. 6C, when the Negative sync code that accompanies the 12H portion is detected, the high side pipe recognizes that the expected Positive code was missed. In response, it enters the synchronization recovery process.

Since the first received sync code is a Negative code, the pipe first enters a SYNC_WT_P1 state, which is a wait state in which the pipe awaits a first Positive sync code. The Positive sync code is received with the 16H packet portion. In response, the pipe enters the SYNC_WT_N2 state in which it waits for a second Negative sync code. The second Negative sync code arrives with the 20H packet portion. In response, the pipe enters the SYNC_WT_P2 state in which it waits to receive a second Positive sync code. The second Positive sync code is received with the 24H packet portion. At this point, synchronization is completely recovered, and the pipe enters the normal sequence of states, beginning with the DATA_OK_P state.

As noted above, in the case of FIG. 6C, the grouping circuitry 38 discards the 9H through 12H and 8L through 11L packet portions in response to the mismatch in pipe Idle counts associated with them. For the 12H through 15H and 12L through 15L corresponding packet portions, the Idle counts are the same. However, the grouping circuitry 38 recognizes that the low side is in a DATA_OK N state but the high side pipe is in a wait state, namely, the SYNC_WT_P1 state. In response, the grouper 38 skips the 12H through 15H packet portions and discards the 12L through 15L portions. When the 16H through 19H and the 16L through 19L portions are examined by the grouper 38, it again is noted that the high side is in the SYNC_WT_N2 wait state. It skips the 16H through 19H portions and discards the 16L through 19L portions. For the 20H through 23H and 20L through 23L portions, the grouper 38 again notes that the high side is in a wait state, namely, the SYNC_WT_P2 state, and, in response, skips the 20H through 23H portions and discards the 20L through 23L portions.

When the 24H packet portion is read, it is noted that the high side has returned to the normal DATA_OK_P state. The grouper 38 notes that both the high and low pipes are in the same state, and resumes regenerating and forwarding full packets with the 24H/24L packet.

It should be noted that in the case of FIG. 6C, in which a polarity (Positive) sync code is missed, no bad data is forwarded to the destination. Instead, data packets are dropped until the pipes are realigned and synchronization is reestablished.

It should be noted that, in accordance with the present invention, by separating the polarity (Positive/Negative) sync codes with Idle sync codes that do not change the states the of the individual pipe state machines, there is a larger number of consecutive errors in a single pipe that must occur in succession before the sync codes repeat such that the grouping circuitry could not recognize the error. For example, in the example described herein, if the grouping circuitry received packet portions with Negative sync codes on a first cycle, one side would have to lose the following three Idle states, the next Positive sync cycle, the next three Idle states and the following Negative sync cycle all in succession if the grouping circuitry were not to be able to detect an error in that side. Hence, the Idle states provide a substantial robustness to the error detection capability of the system.

FIG. 6D is a timing diagram similar to those of FIGS. 6A through 6C which illustrates the condition of a lost Negative sync cycle. The timing diagram of FIG. 6D is analogous to that of FIG. 6C. As shown in FIG. 6D, a Negative sync cycle is missed at the high side 4H packet portion. The missing Negative sync is discovered on the high side at the 8H packet portion. The high side pipe state machine enters the wait process to recover synchronization. At the 8H through 11H packet portions, the high side pipe state machine is in the SYNC_WT_N1 state in which it waits to receive a Negative sync. It transitions to the SYNC_WT_P1 state for portions 12H through 15H while it waits for a Positive sync. When it does, it transitions to the SYNC_WT_N2 state for portions 16H through 19H, while it waits for a second Negative sync. The second Negative sync is received at portion 20H. At this point, synchronization is recovered as the high side pipe state machine returns to the DATA_OK_N state.

Thus, as in the case of a missed Positive sync described above in connection with FIG. 6C, when a Negative sync is missed in one of the pipes, the grouper 38 skips data packet portions from the side with the missing sync (high side) and discards data from the other side (low side) while it waits for the pipes to resynchronize.

Referring again to FIGS. 6A through 6B, in accordance with the invention, when an Idle character is missed, the individual pipe sync state machines do not detect an error. Therefore, they do not perform a resynchronization process, i.e., waiting for the +, −, + or −, +, − sequence to appear. The amount of data missing from the output is determined:by when the grouper 38 discovers the error and resolves it by skipping data until the next state change on the high and low pipes. The actual number of discarded data cycles is dependent on the number of Idles between P/N states. It should be noted that in one embodiment, to minimize the amount of discarded data, if one pipe changes state before the other, the "early" pipe should wait until the other changes state.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of transferring packets of data from a source to a destination, the source being adapted to receive a plurality of said packets of data for transfer to the destination, the method comprising:

for each packet of the plurality of packets of data to be transferred, splitting said data into a first portion and a second portion;

associating a first synchronization code with the first portion of data for each packet;

associating a second synchronization code with the second portion of data for each packet;

with a first processor, analyzing the first portion of data and the associated first synchronization code for each packet of data to identify a first state associated with the first portion of data for each packet;

for each packet of data, storing the first portion of data, its associated first synchronization code and the associated first state in a first storage device;

with a second processor, analyzing the second portion of data and the associated second synchronization code for each packet of data to identify a second state associated with the second portion of data for each packet;

for each packet of data, storing the second portion of data, its associated second synchronization code and the associated second state in a second storage device; and with a third processor, (i) reading from the first storage device one of the first portions of data stored therein, its associated first synchronization code, and its associated first state, (ii) reading from the second storage device one of the second portions of data stored therein, its associated second synchronization code, and its associated second state, (iii) determining whether the first and second portions of data were generated from the same packet of data, and (iv) if the first and second portions of data were generated from the same packet of data, combining them to regenerate the packet of data.

2. The method of claim 1 further comprising, if the first and second portions of data were not generated from the same packet of data, performing a recovery operation to recover synchronization of the portions of data.

3. The method of claim 2 wherein the recovery operation comprises discarding at least one portion of data.

4. The method of claim 2 wherein the recovery operation comprises discarding portions of data read from one of the first and second storage devices until a first or second synchronization code of a portion of data read from the one of the first and second storage devices indicates that the associated portion of data came from the same packet of data as a portion of data read from the other of the first and second storage devices.

5. The method of claim 1 wherein the synchronization codes for like portions of successive packets of data are set to a series of values which repeats periodically.

6. The method of claim 5 wherein each of the synchronization codes for like portions of packets of data is set to one of three values.

7. The method of claim 6 wherein one of the values is an idle value, wherein portions of packets of data associated with the idle value synchronization code are grouped in succession between portions of packets of data associated with synchronization codes having the other two values.

8. The method of claim 7 wherein identifying a state can include counting a number of successive portions of packets assigned an idle value synchronization code.

9. The method of claim 1 wherein each of the first and second storage devices comprises a first-in-first-out (FIFO) storage device.

10. The method of claim 1 wherein the third processor determines whether the first and second portions of data were generated from the same packet of data without transferring any information to the first and second processors.

11. An apparatus for transferring packets of data from a source to a destination, the source being adapted to receive a plurality of said packets of data for transfer to the destination, the apparatus comprising:

a splitting device for (i) receiving from the source each said packet of data to be transferred to the destination and splitting each said packet of data into a first portion and a second portion, (ii) associating a first synchronization code with the first portion of data for each packet, and (iii) associating a second synchronization code with the second portion of data for each packet;

a first processor for analyzing the first portion of data and the associated first synchronization code for each packet of data to identify a first state associated with the first portion of data for each packet;

a first storage device for storing, for each packet of data, the first portion of data, its associated first synchronization code and the associated first state;

a second processor for analyzing the second portion of data and the associated second synchronization code for each packet of data to identify a second state associated with the second portion of data for each packet;

a second storage device for storing, for each packet of data, the second portion of data, its associated second synchronization code and the associated second state; and a third processor for (i) reading from the first storage device one of the first portions of data stored therein, its associated first synchronization code, and its associated first state, (ii) reading from the second storage device one of the second portions of data stored therein, its associated second synchronization code, and its associated second state, (iii) determining whether the first and second portions of data were generated from the same packet of data, and (iv) if the first and second portions of data were generated from the same packet of data, combining them to regenerate the packet of data.

12. The apparatus of claim 11 wherein, if the first and second portions of data were not generated from the same packet of data, the third processor performs a recovery operation to recover synchronization of the portions of data.

13. The apparatus of claim 12 wherein, in the recovery operation, the third processor discards at least one portion of data.

14. The apparatus of claim 12 wherein, in the recovery operation, the third processor discards portions of data read from one of the first and second storage devices until a first or second synchronization code of a portion of data read from the one of the first and second storage devices indicates that the associated portion of data came from the same packet of data as a portion of data read from the other of the first and second storage devices.

15. The apparatus of claim 11 wherein the synchronization codes for like portions of successive packets of data are set to a series of values which repeats periodically.

16. The apparatus of claim 15 wherein each of the synchronization codes for like portions of packets of data is set to one of three values.

17. The apparatus of claim 16 wherein one of the values is an idle value, such that portions of packets of data associated with the idle value synchronization code are grouped in succession between portions of packets of data associated with synchronization codes having either of the remaining set values.

18. The apparatus of claim 17 wherein the first and second processors count a number of successive portions of packets assigned the idle value synchronization code to identify the first and second states.

19. The apparatus of claim 11 wherein each of the first and second storage devices comprises a first-in-first-out (FIFO) storage device.

20. The apparatus of claim 11 wherein the third processor determines whether the first and second portions of data were generated from the same packet of data without transferring any information to the first and second processors.

21. A method of recombining portions of data packets into their original data packets to synchronize transfer of the portions of data packets along multiple separate data paths, a first portion of each data packet being received from a first data path and being stored in a first storage device and a second portion of each packet of data being received from a second data path and-being stored in a second storage device, said method comprising:

reading from the first storage device one of the first portions of data, a first synchronization code associated with the first portion of data, and a first state associated with the first portion of data;

reading from the second storage device one of the second portions of data, a second synchronization code associated with the second portion of data, and a second state associated with the second portion of data;

analyzing the first and second synchronization codes and the first and second states associated with the first and second portions of data, respectively, to determine whether the first and second portions of data were generated from the same packet of data; and if the first and second portions of data were generated from the same packet of data, combining them to regenerate the packet of data.

22. The method of claim 21 wherein it is determined whether the first and second portions of data were generated from the same packet of data without transferring information back along the multiple separate data paths.

23. The method of claim 21 further comprising, if the first and second portions of data were not generated from the same packet of data, performing a recovery operation to recover synchronization of the portions of data.

24. The method of claim 23 wherein the recovery operation comprises discarding at least one portion of data.

25. The method of claim 23 wherein the recovery operation comprises discarding portions of data read from one of the first and second storage devices until a first or second synchronization code of a portion of data read from the one of the first and second storage devices indicates that the associated portion of data came from the same packet of data as a portion of data read form the other of the first and second storage devices.

26. An apparatus for recombining portions of data packets into their original data packets to synchronize transfer of the portions of data packets along multiple separate data paths, a first portion of each data packet being received from a first data path and being stored in a first storage device and a second portion of each packet of data being received from a second data path and being stored in a second storage device, said apparatus comprising a processor for (i) reading from the first storage device one of the first portions of data, a first synchronization code associated with the first portion of data, and a first state associated with the first portion of data, (ii) reading from the second storage device one of the second portions of data, a second synchronization code associated with the second portion of data, and a second state associated with the second portion of data, (iii) analyzing the first and second synchronization codes and the first and second states associated with the first and second portions of data, respectively, to determine whether the first and second portions of data were generated from the same packet of data, and (iv) if the first and second portions of data were generated from the same packet of data, combining them to regenerate the packet of data.

27. The apparatus of claim 26 wherein the processor determines whether the first and second portions of data were generated from the same packet of data without transferring information back along the multiple separate data paths.

28. The apparatus of claim 26 wherein the processor performs a recovery operation to recover synchronization of the portions of data if the first and second portions of data were not generated from the same packet of data.

29. The apparatus of claim 28 wherein, in performing the recovery operation, the processor discards at least one portion of data.

30. The apparatus of claim 28 wherein, in performing the recovery operation, the processor discards portions of data read from one of the first and second storage devices until a first or second synchronization code of a portion of data read from the one of the first and second storage devices indicates that the associated portion of data came from the same packet of data as a portion of data read form the other of the first and second storage devices.

* * * * *